(12) United States Patent
Qi et al.

(10) Patent No.: US 11,952,216 B2
(45) Date of Patent: Apr. 9, 2024

(54) WAREHOUSING SYSTEM, SELF-DRIVING SYSTEM AND METHOD OF POSITIONING A SELF-DRIVING SYSTEM

(71) Applicant: LINGDONG TECHNOLOGY (BEIJING) CO. LTD, Beijing (CN)

(72) Inventors: Ou Qi, Beijing (CN); Guangpeng Zhang, Beijing (CN)

(73) Assignee: LINGDONG TECHNOLOGY (BEIJING) CO. LTD, Beijing (CN)

( * ) Notice: Subject to any disclaimer, the term of this patent is extended or adjusted under 35 U.S.C. 154(b) by 567 days.

(21) Appl. No.: 16/902,534

(22) Filed: Jun. 16, 2020

(65) Prior Publication Data
US 2021/0380340 A1 Dec. 9, 2021

(30) Foreign Application Priority Data
Jun. 3, 2020 (CN) .......................... 202010496306.6

(51) Int. Cl.
*B65G 1/137* (2006.01)
(52) U.S. Cl.
CPC .................................. *B65G 1/1375* (2013.01)
(58) Field of Classification Search
CPC ..................................................... B65G 1/1375
See application file for complete search history.

(56) References Cited

U.S. PATENT DOCUMENTS

| | | | | |
|---|---|---|---|---|
| 6,496,806 B1 * | 12/2002 | Horwitz | ............... | G06Q 10/087 705/28 |
| 7,676,094 B2 * | 3/2010 | Hoki | ....................... | G06V 10/44 382/104 |

(Continued)

FOREIGN PATENT DOCUMENTS

| | | |
|---|---|---|
| CN | 1245951 A | 3/2003 |
| CN | 104483966 A | 4/2015 |

(Continued)

OTHER PUBLICATIONS

The EESR and cited reference(s) for EP211751649 dated Dec. 8, 2021 by EPO.

(Continued)

*Primary Examiner* — Kyle O Logan
(74) *Attorney, Agent, or Firm* — NZ CARR LAW OFFICE

(57) ABSTRACT

Embodiments of the present disclosure relates to a warehousing system. The warehousing system includes a first ground marking arranged on a ground surface of a warehouse. The first ground marking includes machine-readable characteristics representing a warehouse location identification number (ID). The machine-readable characteristics include one or more horizontal lines parallelly arranged at equal intervals, wherein the total number of the one or more horizontal lines corresponding to a first information of the warehouse location ID, and one or more vertical lines parallelly arranged at equal intervals, wherein the total number of the vertical lines corresponding to a second information of the warehouse location ID that is different from the first information. The machine-readable characteristics are recognizable by one or more cameras of a self-driving system, and the self-driving system is operable to determine its position on a map of the warehouse based on the warehouse location ID.

20 Claims, 13 Drawing Sheets

(56) References Cited

U.S. PATENT DOCUMENTS

| | | | |
|---|---|---|---|
| 9,436,184 B2* | 9/2016 | D'Andrea | B66F 9/063 |
| 9,632,504 B1* | 4/2017 | Watts | G05D 1/0231 |
| 10,138,060 B1* | 11/2018 | Mantha | B65G 1/1371 |
| 10,242,273 B1* | 3/2019 | Eckman | G01S 3/00 |
| 2007/0282482 A1* | 12/2007 | Beucher | G06Q 10/08 |
| | | | 700/226 |
| 2009/0099898 A1* | 4/2009 | Ehrman | G06Q 10/06 |
| | | | 705/7.15 |
| 2012/0126000 A1* | 5/2012 | Kunzig | B66F 9/24 |
| | | | 235/385 |
| 2012/0191272 A1* | 7/2012 | Andersen | B66F 9/24 |
| | | | 705/28 |
| 2014/0247116 A1* | 9/2014 | Davidson | G05D 1/0261 |
| | | | 901/1 |
| 2014/0277691 A1* | 9/2014 | Jacobus | G05D 1/0274 |
| | | | 700/216 |
| 2017/0029213 A1* | 2/2017 | Johnson | B25J 11/008 |
| 2018/0065258 A1* | 3/2018 | Liu | B25J 19/023 |
| 2018/0158016 A1* | 6/2018 | Pandya | G05B 19/41895 |
| 2019/0108605 A1* | 4/2019 | Komiyama | H04N 7/183 |
| 2019/0138978 A1* | 5/2019 | Johnson | G06Q 10/08 |
| 2020/0109007 A1* | 4/2020 | Li | G06Q 10/087 |
| 2020/0250610 A1* | 8/2020 | Schoening | G06K 7/10475 |
| 2020/0326680 A1* | 10/2020 | Wang | G05B 19/4185 |
| 2020/0393834 A1* | 12/2020 | Chen | G05D 1/024 |
| 2021/0321763 A1* | 10/2021 | Wang | B65G 1/02 |
| 2022/0237816 A1* | 7/2022 | Jiang | G01C 21/3647 |

FOREIGN PATENT DOCUMENTS

| | | |
|---|---|---|
| CN | 104699104 A | 6/2015 |
| CN | 105775544 A | 7/2016 |
| CN | 109573438 A | 4/2019 |
| JP | 3159649 B2 | 4/2001 |
| JP | 2005089012 A | 4/2005 |
| JP | 2018508087 A | 3/2018 |
| JP | 2020504679 A | 2/2020 |

OTHER PUBLICATIONS

First Office Action, Search Report and cited reference(s) for CN2020104963066 dated Oct. 30, 2020 by SIPO.
Second Office Action, Search Report and cited reference(s) for CN2020104963066 dated Jan. 12, 2021 by SIPO.
The Notice of Reasons for Refusal and cited reference(s) for JP2021-080814 dated Apr. 26, 2022 by JPO.

* cited by examiner

WAREHOUSING SYSTEM, SELF-DRIVING SYSTEM AND METHOD OF POSITIONING A SELF-DRIVING SYSTEM

BACKGROUND

Field

Embodiments disclosed herein relate to an intelligent warehousing technology for self-driving systems.

Description of the Related Art

Self-driving systems such as Autonomous Mobile Robots (ARMs) or Automatic Guided Vehicles (AGVs) are driverless, programmable controlled system that can transport a load over long distances. Self-driving systems can provide a safer environment for workers, inventory items, and equipment with precise and controlled movement.

Global positioning system (GPS) technology has been reliable for positioning self-driving systems when used outdoors. However, positioning and navigating self-driving systems using GPS signals in most indoor environments (e.g., a warehouse) have been problematic because GPS satellites do not transmit signals strong enough to pass through the roofs and walls of buildings. While self-driving systems are often equipped with a camera to gather sensory data on its environment, it is still a challenging job for self-driving systems to locate themselves on a given map relying solely on its computer vision due to physical limitations of the camera and the fact that all lanes within the warehouse look the same to the camera.

Therefore, there exists a need for an intelligent warehousing technology for self-driving systems that can address the above-mentioned issues.

SUMMARY

Embodiments of the present disclosure relates to an intelligent warehousing technology for self-driving systems. In one embodiment, a warehousing system is provided. The warehousing system includes a first ground marking arranged on a ground surface of a warehouse. The first ground marking includes machine-readable characteristics representing a warehouse location identification number (ID). The machine-readable characteristics include one or more horizontal lines parallelly arranged at equal intervals, wherein the total number of the one or more horizontal lines corresponding to a first information of the warehouse location ID, and one or more vertical lines parallelly arranged at equal intervals, wherein the total number of the vertical lines corresponding to a second information of the warehouse location ID that is different from the first information. The machine-readable characteristics are recognizable by one or more cameras of a self-driving system, and the self-driving system is operable to determine its position on a map of the warehouse based on the warehouse location ID.

In another embodiment, a self-driving system is provided. The self-driving system includes a mobile base having one or more motorized wheels, a plate disposed over and coupled to the mobile base, one or more cameras disposed on the plate, and a controller. The controller is operable to project a field of view from the one or more cameras onto a ground surface of a facility, and the ground surface includes a first ground marking. The controller is also operable to determine the location of the self-driving system on a map of the facility based on information of the first ground marking appeared in the field of view, and navigate the self-driving system from the determined location to a destination.

In yet another embodiment, a method of positioning a self-driving system in a warehouse is provided. The method includes using one or more cameras of the self-driving system to recognize information of a first ground marking applied on and along a ground surface of the warehouse, wherein the first ground marking comprises machine-readable characteristics representing a warehouse location identification number (ID). The machine-readable characteristics include one or more horizontal lines parallelly arranged at equal intervals, wherein the total number of the horizontal lines corresponding to a first information of the warehouse location ID, and one or more vertical lines parallelly arranged at equal intervals, wherein the total number of the vertical lines corresponding to a second information of the warehouse location ID that is different from the first information. The method also includes determining if the information of the first ground marking is sufficient to pinpoint current location of the self-driving system on a map of the warehouse, and navigating the self-driving system from the current location of to a destination.

BRIEF DESCRIPTION OF THE DRAWINGS

To facilitate understanding, identical reference numerals have been used, where possible, to designate identical elements that are common to the figures. It is contemplated that elements disclosed in one embodiment may be beneficially utilized with other embodiments without specific recitation.

DETAILED DESCRIPTION

Embodiments of the present disclosure relate to an intelligent warehousing technology for self-driving systems. It should be understood that while the term "self-driving system" is used in this disclosure, the concept of various embodiments in this disclosure can be applied to any self-driving vehicles and mobile robots, such as autonomously-navigating mobile robots, inertially-guided robots, remote-controlled mobile robots, and robots that are guided by laser targeting, vision systems, or roadmaps. Various embodiments are discussed in greater detail below with respect to FIGS. 1-13.

Figure 1:
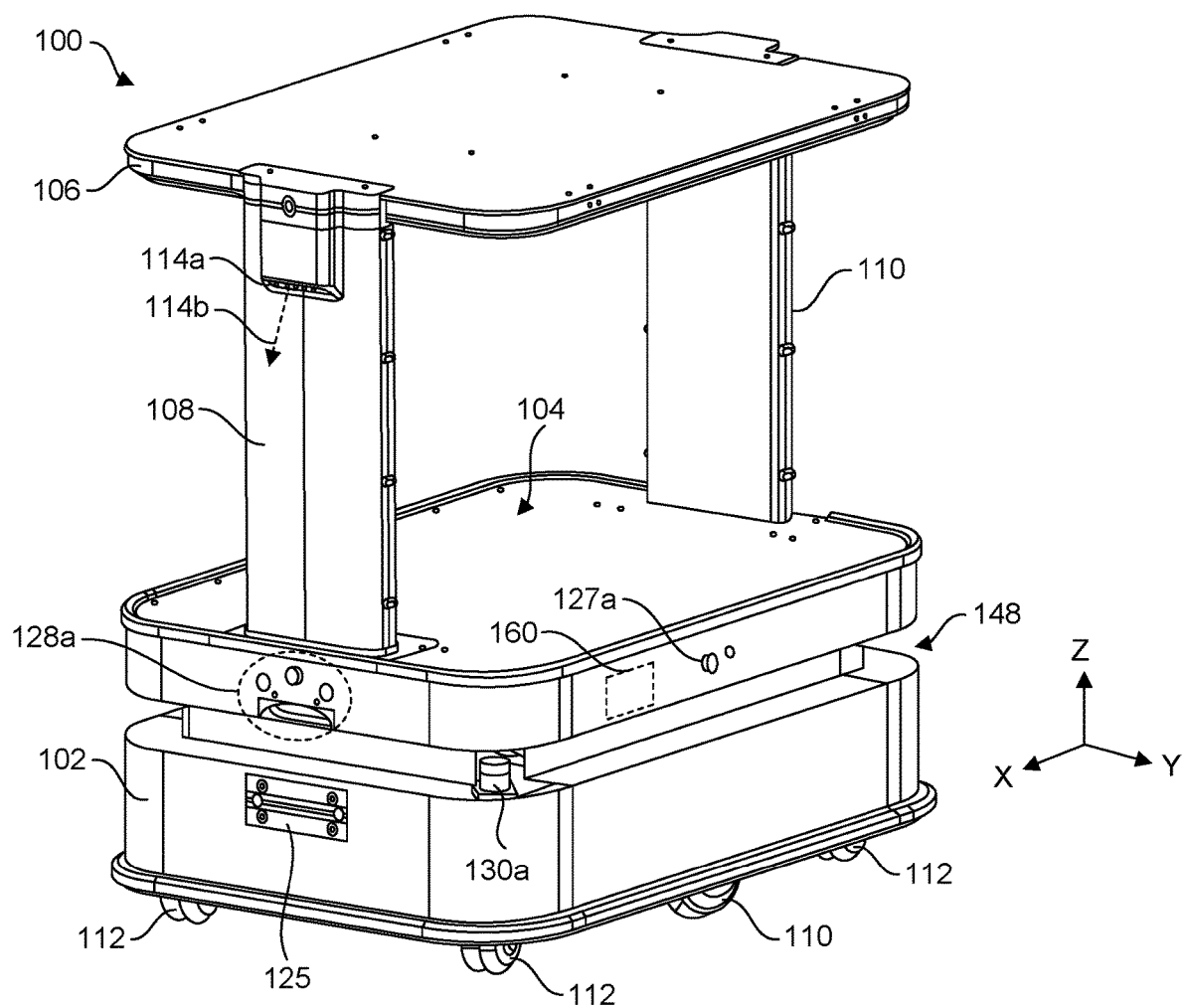
FIG. 1 illustrates a schematic front view of a self-driving system according to embodiments of the present disclosure.
Figure 2:
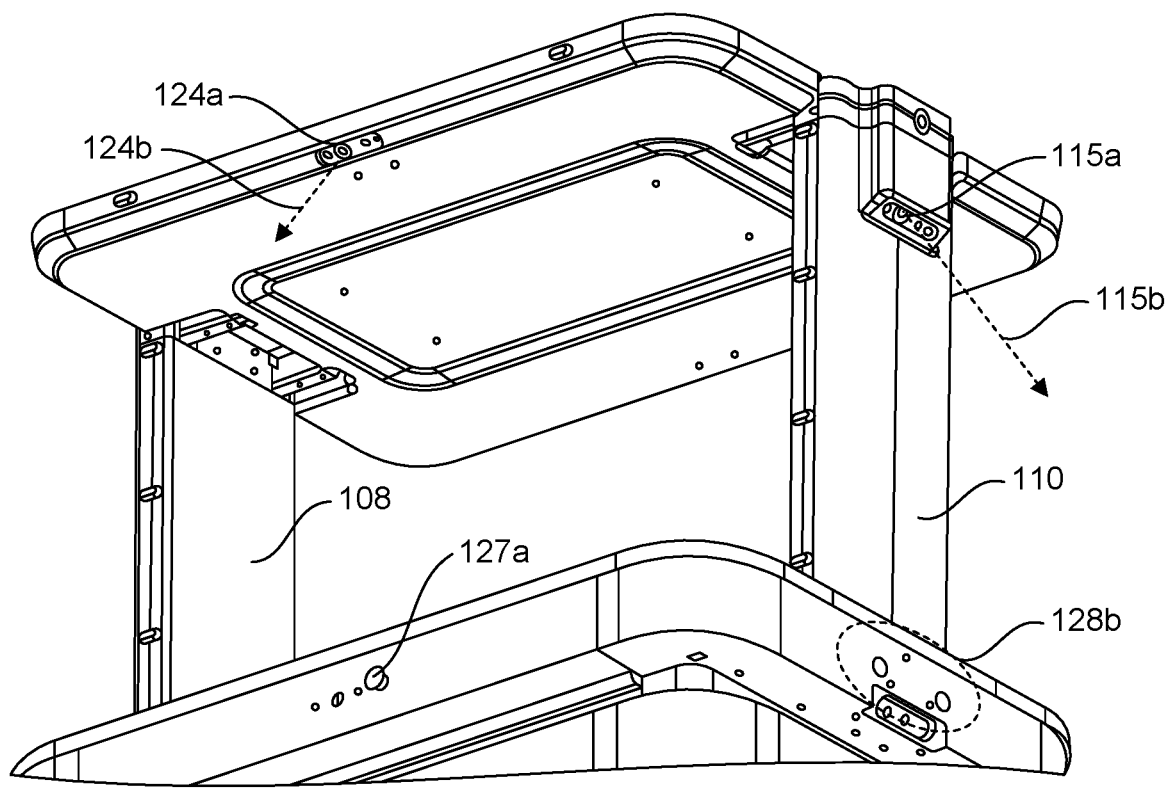
FIGS. 2 and 3 illustrate a portion of the self-driving system of FIG. 1 according to embodiments of the present disclosure.
Figure 3:
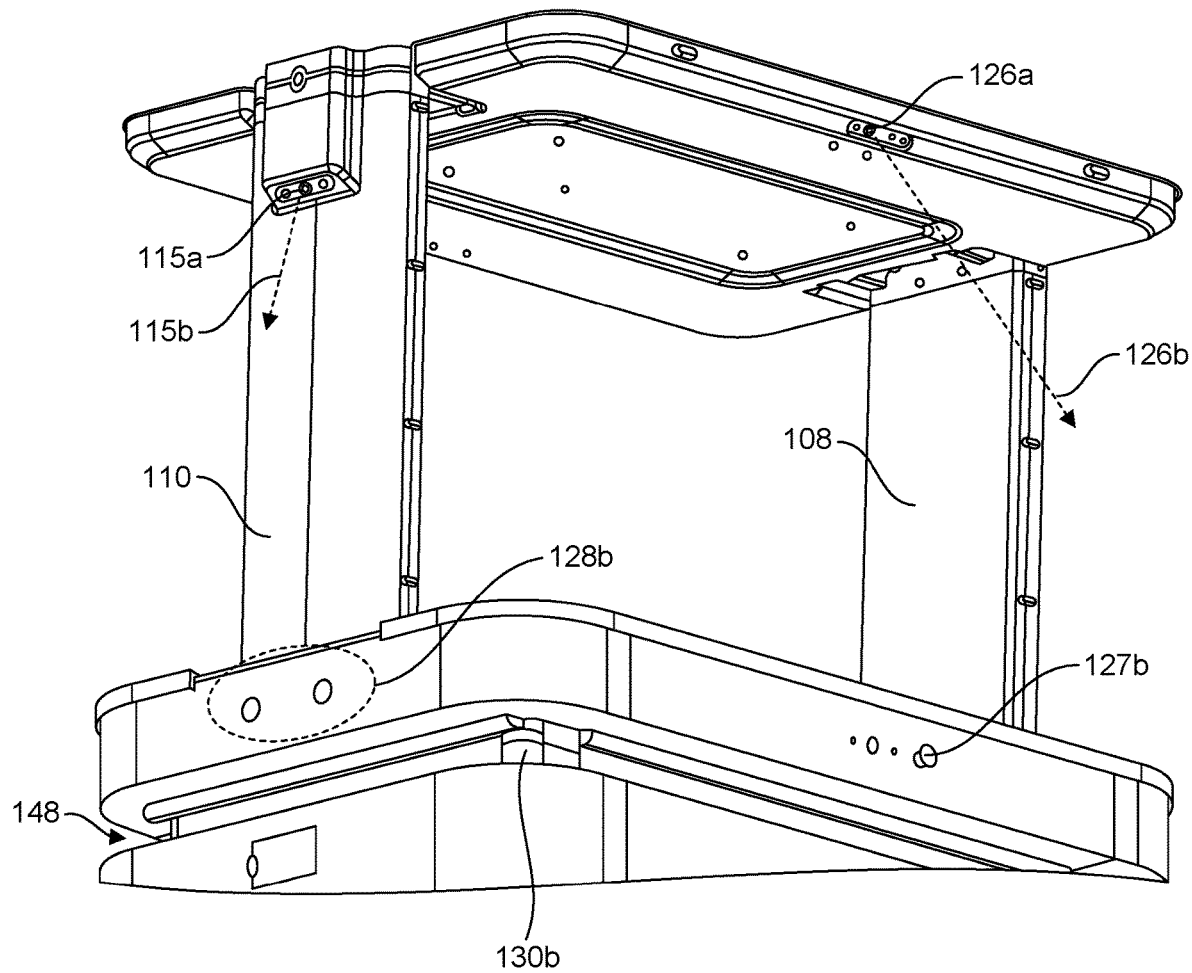

FIG. 1 illustrates a schematic front view of a self-driving system 100 according to embodiments of the present disclosure. The self-driving system 100 can be used as package carriers in various facilities, such as warehouses, hospitals, airports, and other environments that may use automated package transportation. The self-driving system 100 generally includes a mobile base 102 and a plate 106 disposed over the mobile base 102 for supporting goods. Frames 108, 110 are upstandingly and parallelly disposed at opposing ends of the mobile base 102. The frames 108, 110 extend from a top surface 104 of the mobile base 102 to the peripheral of the plate 106. The plate 106 may be removably connected to the mobile base 102. According to the storage needs of the customers, the height of the plate 106 may be adjusted, either by increasing or decreasing the height of the frames 108, 110, or securing the plate 106 at different height of the frames 108, 110. In some embodiments, the mobile base 102 can move up and down vertically using one or more actuators (not shown) embedded in the mobile base 102.

The self-driving system 100 is directed to move autonomously between designated areas within a facility, such as a warehouse. The mobility of the self-driving system 100 is achieved through a motor that connects to one or more motorized wheels 110 and a plurality of stabilizing wheels 112. Each of the motorized wheels 110 is configured to rotate and/or roll in any given direction to move the self-driving system 100. For example, the motorized wheels 110 can rotate about the Z-axis and roll forward or backward on the ground about its axle spindle along any directions, such as along the X-axis or along the Y-axis. The motorized wheels 110 may be controlled to roll at different speed. The stabilizing wheels 112 may be caster-type wheels. In some embodiments, any or all stabilizing wheels 112 may be motorized.

A charging pad 125 is provided at the front or rear end of the mobile base 102 to allow automatic charging of the self-driving system 100 upon docking of the self-driving system 100 with respect to a charging station (not shown).

The self-driving system 100 may have one or more emergency stop buttons 127a, 127b configured to stop a moving self-driving system when pressed. The emergency stop button 127a, 127b (better seen in FIG. 3) may be disposed at either side of the mobile base 102 or any suitable place for easy access.

The self-driving system 100 is equipped with a plurality of cameras configured to recognize ground markings and/or machine-readable labels of an intelligent warehousing system, as will be discussed in more detail below with respect to FIGS. 4 to 11. The cameras may be disposed around and faced outwards from the self-driving system 100. In one embodiment, a front end camera 114a is disposed on an upper portion of the frame 108. The front end camera 114a is pointed forward and down (e.g., front-forward facing) for interacting with the intelligent warehousing system and/or catching other low-profile objects, such as pallets. In one example, the front end camera 114a is oriented to point to a direction 114b that is at an angle (e.g., 20°-80°) with respect to an imaginary axis parallel to the longitudinal direction of the frame 108. Likewise, a rear end camera 115a (better seen in FIGS. 2 and 3) is disposed on an upper portion of the frame 110 and pointed backward and down (e.g., down-backward facing) for interacting with the intelligent warehousing system and catching other low-profile objects. The rear end camera 115a is oriented to point to a direction 115b that is at an angle (e.g., 20°-80°) with respect to an imaginary axis parallel to the longitudinal direction of the frame 110.

The opposing length sides of the plate 106 are also equipped with a side camera 124a, 126a, respectively, for interacting with the intelligent warehousing system and other low-profile objects. The side cameras 124a, 126a face outwards from the self-driving system 100. In one example, the side camera 124a is oriented to point to a direction 124b that is at an angle (e.g., 20°-80°) with respect to an imaginary axis parallel to the longitudinal direction of the frames 108, 110. Likewise, the side camera 126a is oriented to point to a direction 126b that is at an angle (e.g., 20°-80°) with respect to an imaginary axis parallel to the longitudinal direction of the frames 108, 110.

The front end camera 114a, the rear end camera 115a, and the side cameras 124a, 126a may be a monocular camera, a binocular camera, a stereo camera, a general-purpose camera, or any combination thereof. In addition to interacting with the intelligent warehousing system, the cameras 114a, 115a, 124a, 126a may also be used to capture image or video of an object, which can be a label such as markers, barcodes, or QR codes that contain machine-readable information regarding the location of the object. In some embodiments, the cameras 114a, 115a, 124a, 126a can even be used to capture image or video of a human operator. In any case, the information obtained by the cameras 114a, 115a, 124a, 126a are calculated by a controller 160 located within the self-driving system 100. The calculated data are used to determine a position of the self-driving system 100 on a given map. Once the location of the self-driving system 100 is determined, the self-driving system 100 may proceed to obtain order information/task instruction from a remote server (such as a warehouse management system) and start navigation.

The self-driving system 100 may further include one or more machine-vision cameras. In some embodiments, a set of machine-vision cameras 128a, 128b may be disposed at front end and/or back end of the mobile base 102. The machine-vision cameras 128a, 128b face outwards from the self-driving system 100 and are used to recognize characteristics of a human operator. Exemplary characteristics may include, but are not limited to, facial features of the operator, a shape of the operator, bone structures of the operator, a pose/gesture of the operator, the clothing of the operator, or any combination thereof. The machine-vision cameras 128a, 128b can capture a full body image (or video) of the operator and identify the operator using the characteristics discussed above for purpose of following the operator in any given direction. Exemplary machine-vision cameras 128a, 128b may include, but are not limited to, a Red, Green, Blue plus Depth (RGB-D) camera, a camera that uses Time-of-Flight (ToF) technique, a monocular camera, a binocular camera, a stereo camera, a general-purpose camera, or any combination thereof.

A plurality of proximity sensors 130a, 130b (proximity sensor 130b can be better seen in FIG. 3) may be disposed at the mobile base 102 for further obstacle avoidance. The proximity sensors 130a, 130b may be a LiDAR (Light Detection and Ranging) sensor, a sonar sensor, an ultrasonic sensor, an infrared sensor, a radar sensor, a sensor that uses light and laser, or any combination thereof. In various embodiments of the disclosure, the proximity sensor 130a, 130b are a LiDAR sensor.

The proximity sensors 130a, 130b may be disposed at a cutout 148 of the mobile base 102. The cutout 148 extend around and inwardly from a peripheral edge of the mobile base 102. In one embodiment, the proximity sensors 130a, 130b are disposed at diagonally opposite corners of the mobile base 102, respectively. The proximity sensors are configured to sense a field of view greater about 90 degrees, for example about 270 degrees. The extension of the cutout 148 allows the proximity sensors 130a, 130b to provide greater sensing area for the self-driving system 100. If desired, four corners of the mobile base 102 can be equipped with the proximity sensors.

Various embodiments for enabling the self-driving system 100 to determine its location on a given map may be implemented through the controller 160. The controller 160 may include one or more processors, which can be a programmable central processing unit (CPU) or any suitable device that is operable with a memory. The controller 160 works with computer-executable program code to direct movement of the motorized wheels of the self-driving system 100 using information recognized by the camera(s) to perform various functions/operations of the self-driving system 100, as described in the embodiments of this disclosure. The computer-executable program code may be provided as a computer program product, for example in the form of a non-transitory computer-readable medium storing computer-executable program code for performing the embodiments herein when being loaded into the controller. One such medium may be in the form of a CD-ROM disc, a memory stick, or the like. The computer program code may furthermore be provided as pure program code on the remote server and downloaded to the controller 160 of the self-driving system 100.

Figure 4:
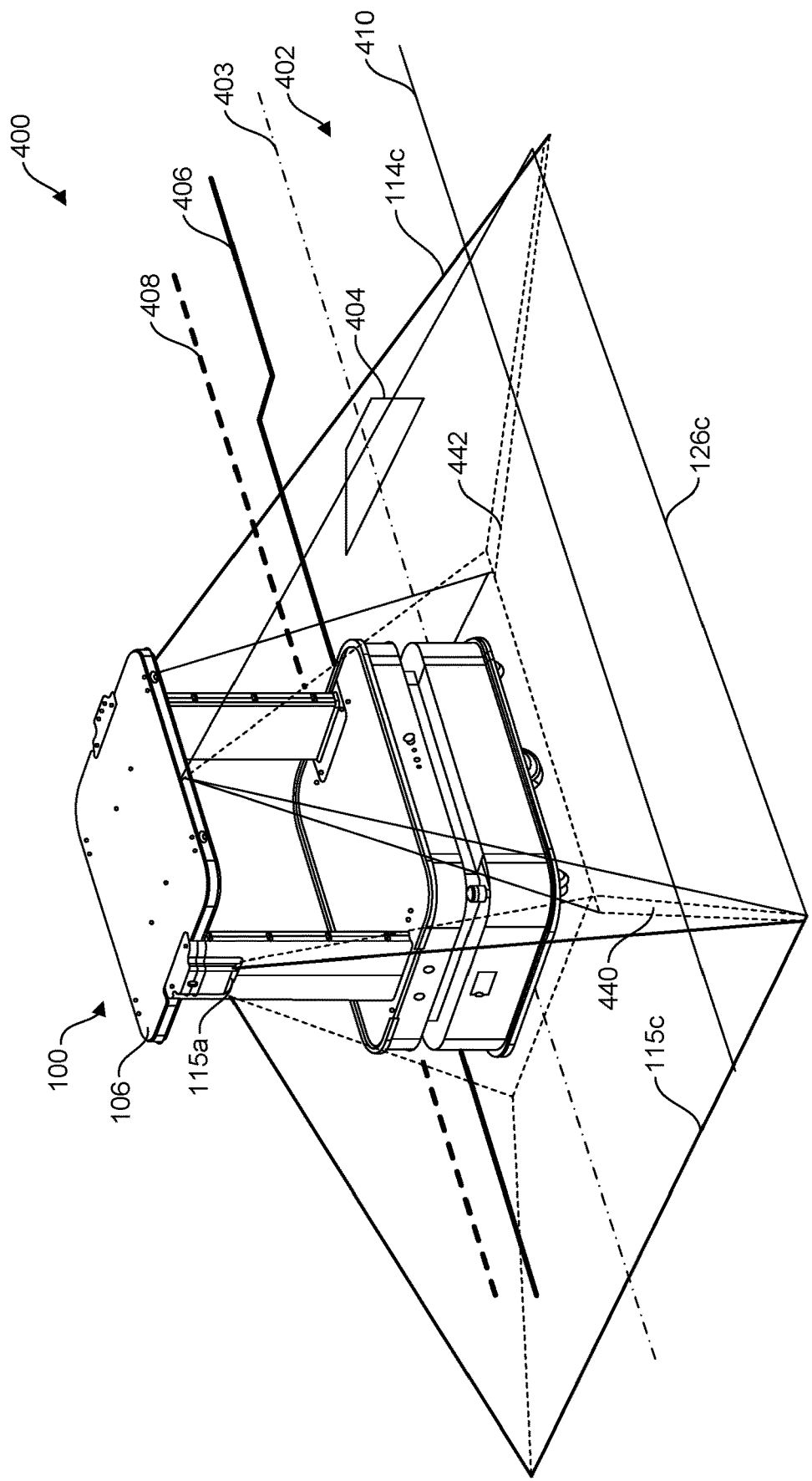
FIG. 4 illustrates a schematic view of a self-driving system interacting with an intelligent warehousing system according to embodiments of the present disclosure.

FIG. 4 illustrates a schematic view of a self-driving system 100 interacting with an intelligent warehousing system 400 according to embodiments of the present disclosure. The intelligent warehousing system 400 generally includes a first ground marking 404, a second ground marking 406, a third ground marking 408, and a fourth ground marking 410. While four ground markings are shown, it is understood that the intelligent warehousing system 400 may include any number and any kind/combination of the ground markings 404, 406, 408, 410, depending on the needs of the facility.

The first, second, third, and fourth ground markings 404, 406, 408, 410 may be 2-dimensional or essentially 2-dimensional, and may be in the form of paint, tape, plate, wire, stripe, projected light, or the like, that can be provided on and along a ground surface 402. The ground surface 402 can be any paved or unpaved surface made for traveling by the self-driving system 100 or a vehicle, and may be of any shape, width and length. The ground surface 402 can include any arbitrary number of passageways, lines, lanes, intersections, cross sections, etc. In one embodiment, the ground surface 402 represents a lane inside a facility, such as a warehouse aisle. The first, second, third, and fourth ground markings 404, 406, 408, 410 can be applied along the warehouse aisle. The first, second, third, and fourth ground markings 404, 406, 408, 410 can also be applied on any road surface outdoors.

The self-driving system 100 may travel along a planned moving course 403 before or while performing a task. Any or all cameras 114a, 115a, 124a, 126a of the self-driving system 100 may be kept power-on and operated concurrently while traveling on the ground surface 402. FIG. 4 illustrates one example where the front end camera 114a (FIG. 1), the side camera 126a (FIG. 3), and the rear end camera 115a (FIG. 3) each projects a field of view 114c, 126c, 115c onto the ground surface 402, respectively. The field of view herein refers to a region of space defined by a solid angle that extends from an optical center of the camera and for which points therein are captured by the camera's optical system. In this disclosure, the field of view of the camera can also be considered as a sensing field of the camera. It should be noted that lines connecting boundary lines of the field of views 114c, 126c, 115c are shown to aid in visualizing the view angle of the field of views 114c, 126c, 115c, and therefore should not be considered as a limit to how far field of view extends from the cameras 114a, 126a, 115a.

As the self-driving system 100 travels on the ground surface 402, the first, second, third, and fourth ground markings 404, 406, 408, 410 may appear in the field of views 114c, 126c, 115c and be detected by the cameras 114a, 126a, 115a. While not shown, it should be appreciated that the side cameras 124a (FIG. 2) may also detect an arbitrary number of any of the first, second, third, and fourth ground markings 404, 406, 408, 410 as the self-driving system 100 travels along the moving course 403. In some cases, the height and angle of the cameras 114a, 115a, 124a, 126a are configured such that there is partial overlapping area between adjacent field of views of the cameras 114a, 115a, 124a, 126a. For ease of illustration, FIG. 4 only shows overlapping areas 440, 442 which are located between the field of views 115c and 126c and between the field of views 114c and 126c, respectively. An overlap between the field of views ensures a blind line that would otherwise extend diagonally from respective four corners of the self-driving system 100 is eliminated.

Figure 5:
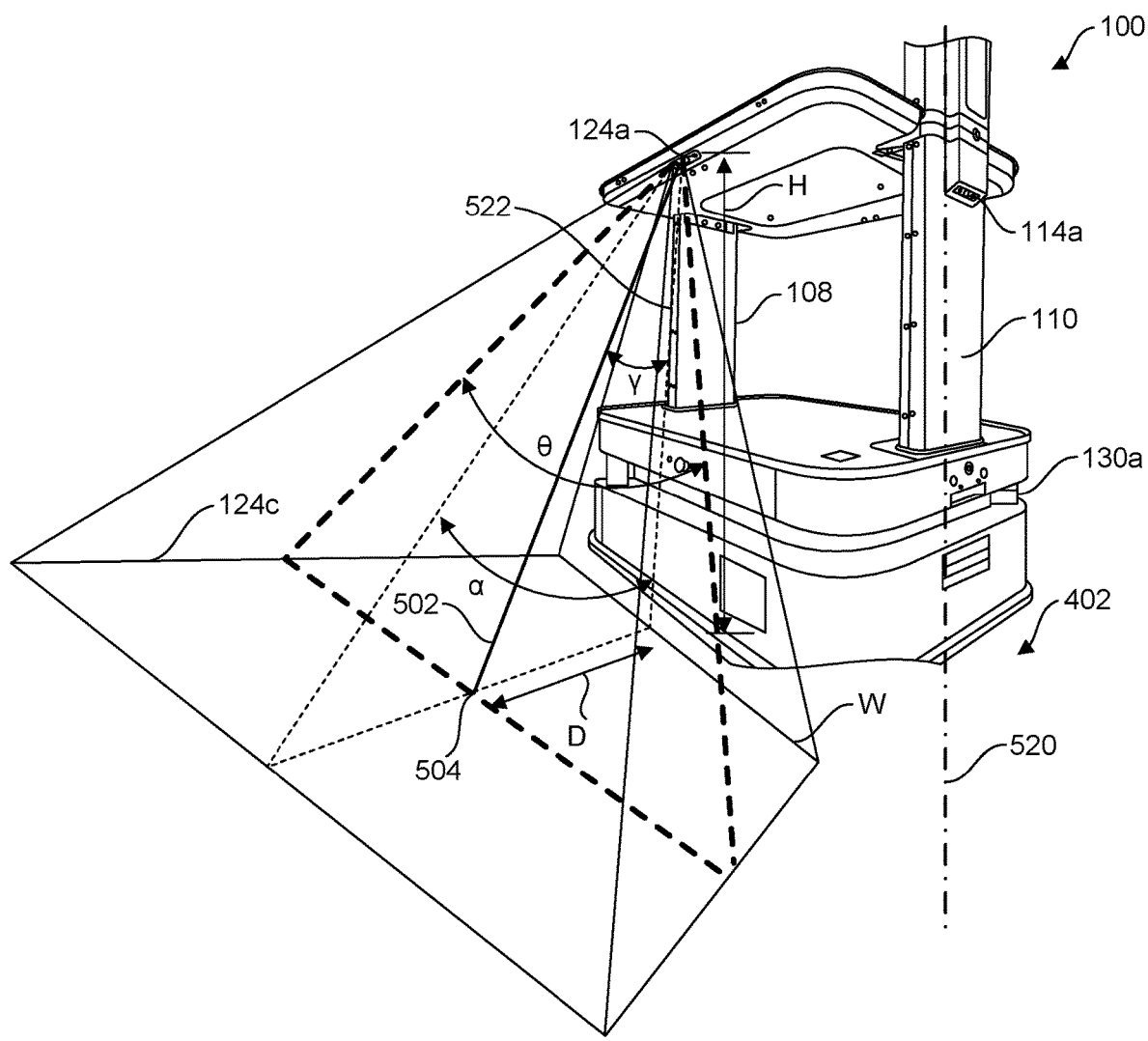
FIG. 5 illustrates calculating a tilt angle of a camera for the self-driving system according to embodiments of the present disclosure.

The height of the plate 106 may vary according to the storage needs of the customers. Once the height of the plate 106 is determined, the tilt angle of the cameras 114a, 115a, 124a, 126a may need to be adjusted accordingly so that the cameras' field of view is pointed to a view angle needed for interacting with the intelligent warehousing system, e.g., by recognizing machine-readable characteristics of the ground markings 404, 406, 408, 410 on the ground surface. The view angle herein may be defined for any plane (e.g., the ground surface 402) that intersects the cameras' optical axis, such as an optical axis 502 of the camera 124a as shown in FIG. 5. As an example shown in FIG. 5, an ordinary skill in the art can calculate the tilt angle "Y" of the cameras (e.g., camera 124a) using trigonometry and/or other suitable approach, with one or more of following factors taken into consideration: (1) the vertical height "H" of the camera 124a measuring from the ground surface 402; (2) the vertical view angle "α" measured from top to bottom edge of the field of view 124c of the camera 124a; (3) the horizontal view angle "θ" measured from left to right edge of the field of view 124c of the camera 124a; and (4) the horizontal distance "D" measuring from a boundary line "W" of the camera's sensing field to a center point 504 of the field of view 124c, wherein the boundary line "W" is the line of the field of view 124c being closest to the self-driving system 100.

The tilt angle "Y" of the camera 124a can be defined as an angle between the optical axis 502 of the camera 124a extending to the center point 504 of the field of view 124c and an imaginary line 522 corresponding to the vertical height "H" of the camera 124a. In various embodiments, the tilt angle "Y" of the camera 124a may be in a range from about 20° to about 80°, such as about 30° to about 65°. Stated alternatively, the optical axis of the cameras (e.g., optical axis 502 of the camera 124a) may be oriented to a direction that is at a tilt angle "Y" of about 20° to about 80°, such as about 30° to about 65°, with respect to an imaginary axis 520 that is parallel to the imaginary line 522 or a longitudinal axis of the frames 108, 110. It is contemplated that the angles discussed herein (e.g., tilt angle "Y" or horizontal view angle "θ") are equally applicable to the cameras 114a, 115a, 126a, and that the angles may vary depending on target objects to be captured by the cameras 114a, 115a, 124a, 126a.

Various examples of the first, second, third, and fourth ground marking 404, 406, 408, 410 are further discussed with respect to FIGS. 6A-6B, 7A-7C, 8, 9, 10A-10G, and 11. In general, each of the first, second, third, and fourth ground markings 404, 406, 408, 410 contains machine-readable characteristics that can be captured and processed by the self-driving system 100. The machine-readable characteristics may include, but are not limited to, point, line, plane, distance, angle, surface, curve, or any suitable geometrics, diagrams, graphics, markers, barcodes, or any combination thereof. One or more machine-readable characteristics can be arranged in various patterns each being associated with a unique information that can be used to locate position of the self-driving system 100, and/or control operation of the self-driving system 100. The machine-readable characteristics discussed in this disclosure are customizable, depending on the application.

In one embodiment, which can be combined with any other embodiments discussed in this disclosure, the first ground marking 404 contains machine-readable characteristics representing a unique location information on a given map (e.g., a map of the warehouse), which may be stored in the self-driving system 100 and/or the remote server. The first ground marking 404 may be applied on the ground surface of the facility at pre-determined intervals. The image(s) of the first ground marking 404 captured by any of the cameras 114a, 115a, 124a, 126a can be used for identifying the current location of the self-driving system 100 on the map.

Figure 6A:
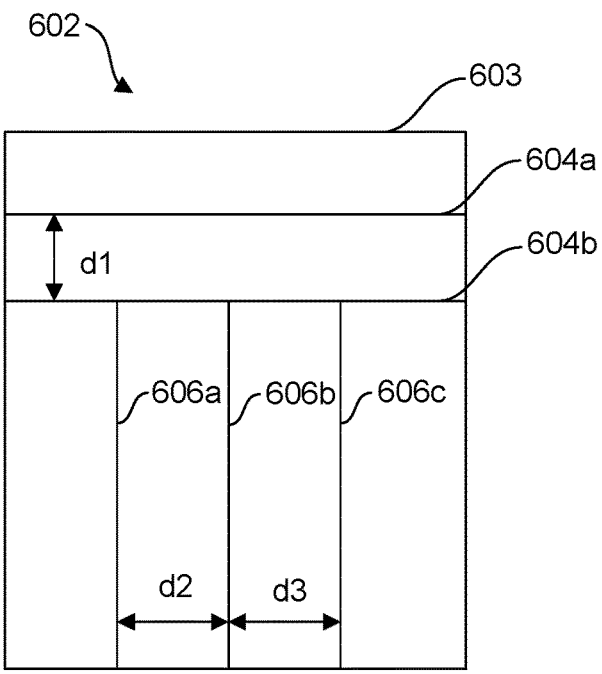
FIGS. 6A and 6B illustrate an example of a first ground marking according to embodiments of the present disclosure.

FIG. 6A illustrates an example of a first ground marking 602 which uses horizontal lines 604a, 604b and vertical lines 606a, 606b, 606c to indicate a unique location information of a facility, such as a warehouse location identification number (ID). The horizontal lines 604a, 604b and the vertical lines 606a-606c are confined by a boundary line 603. The boundary line 603 may have a shape of square, circle, rhombus, hexagon, pentagon, oval, or any suitable polygon. The total number of the horizontal lines 604a, 604b (not counting the boundary line 603) corresponds to an aisle number, and the total number of the vertical lines 606a, 606b, 606c (not counting the boundary line 603) corresponds to a section number. In this case, the first ground marking 602 represents a warehouse location ID of Aisle 02, Section 03. It is contemplated that the concept of the first ground marking 602 can be applied to or represented by any machine-readable characteristics discussed above.

In some embodiments, the horizontal lines 604a-604b are parallelly positioned at equal intervals (e.g., the shortest straight line distance (e.g., distance d1) between horizontal lines 604a, 604b is identical). Likewise, the vertical lines 606a-606c are parallelly arranged at equal intervals (e.g., the shortest straight line distance (e.g., distance d2, d3) between horizontal lines 606a, 604b is identical). The distance d1, d2 and d3 may be in a range from about 5 inches to about 25 inches, which is varied depending on application.

Figure 6B:
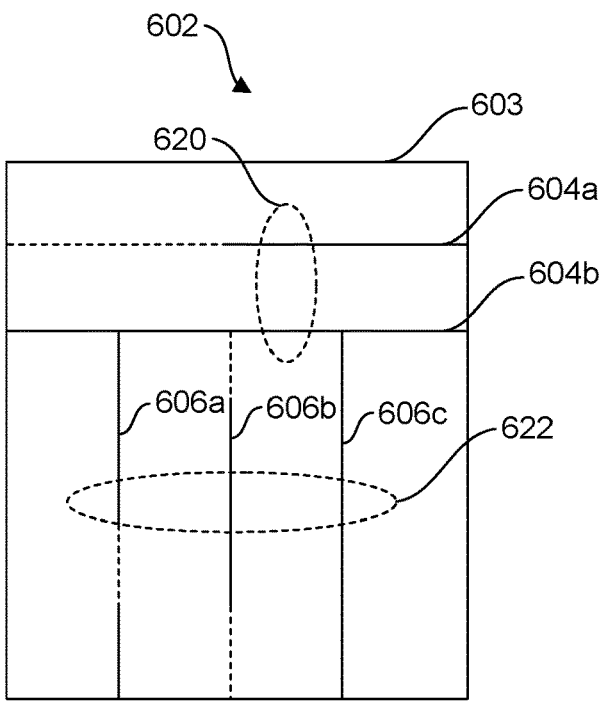

Allocating the space equally among horizontal lines 604a-604b and the vertical lines 606a-606c allows the self-driving system 100 to accurately read the information of the first ground marking 602 even if portions of the first ground marking 602 cannot be identified by the cameras for some reason (e.g., when a part of the horizontal lines 604a-604b or the vertical lines 606a-606c are worn out (e.g., paint partially missing) or hidden by an obstruction such as debris or water, for example). FIG. 6B illustrates an example where portions (indicated by dashed lines) of the first ground marking 602 are worn out. In such a case, the self-driving system 100 can still read the information by identifying the remaining horizontal lines 604a, 604b and the vertical lines 606a-606c having such equal interval relationship remained intact, for example regions indicated by dashed lines 620, 622. In this manner, the first ground markings 404, 602 can offer better wear-out tolerance than traditional road markings using an optical label (e.g., QR codes).

Figure 7A:
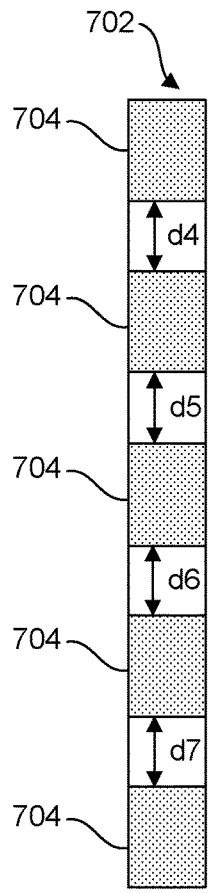
FIGS. 7A, 7B, 7C illustrate examples of a second ground marking according to embodiments of the present disclosure.
Figure 7B:
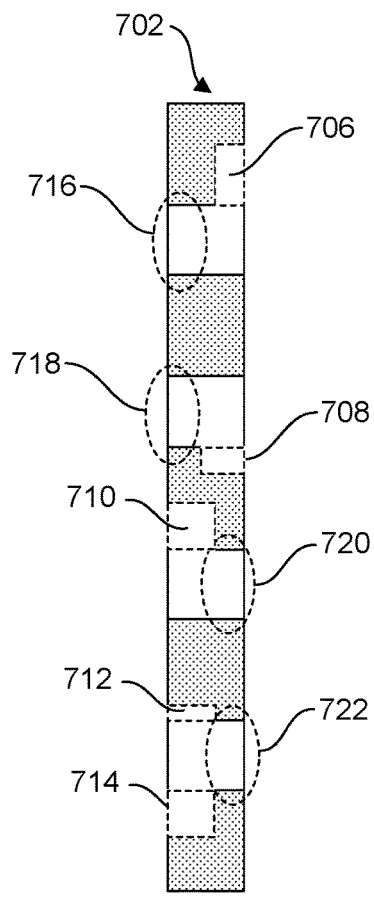

In some embodiments, which can be combined with any other embodiments discussed in this disclosure, the second ground marking 406 contains machine-readable characteristics representing information directing the operation of the self-driving system 100. FIG. 7A illustrates an example of a second ground marking 702 which is a line section having an arbitrary number of stripes 704 alternatingly distributed along a longitudinal direction of the second ground marking 702 at equal intervals d4, d5, d6, d7. The alternating stripes 704 may have a color that can be recognized by the cameras 114a, 115a, 124a, 126a. The intervals d4-d7 are made equal so that the self-driving system 100 can still read the information of the second ground marking 702 correctly even if portions of the second ground marking 702 cannot be identified by the cameras for some reason (e.g., when a part of the stripes 704 are worn out (e.g., paint partially missing) or hidden by an obstruction such as debris or water, for example). FIG. 7B illustrates an example where portions 706, 708, 710, 712, 714 (indicated by dashed lines) of the stripes 704 are worn out. In such a case, the self-driving system 100 can still read the information by identifying the remaining stripes 704 having such equal interval relationship remained intact, for example regions indicated by dashed lines 716, 718, 720, 722.

In some embodiments, which can be combined with any other embodiments discussed in this disclosure, the second ground marking 702 is used to provide information relating to a travel distance of the self-driving system 100, or information relating to a travel distance of the self-driving system 100 from a reference point. The reference point may be the first ground marking 602 that was previously recognized by the self-driving system 100, or any pinpoints already identified by the self-driving system 100 while traveling along a route. Since the intervals d4, d5, d6, and d7 are fixed, the self-driving system 100 can determine how far the self-driving system 100 has traveled by calculating the number of alternating stripes, and such information is useful in determining its current location on a given map.

Figure 7C:
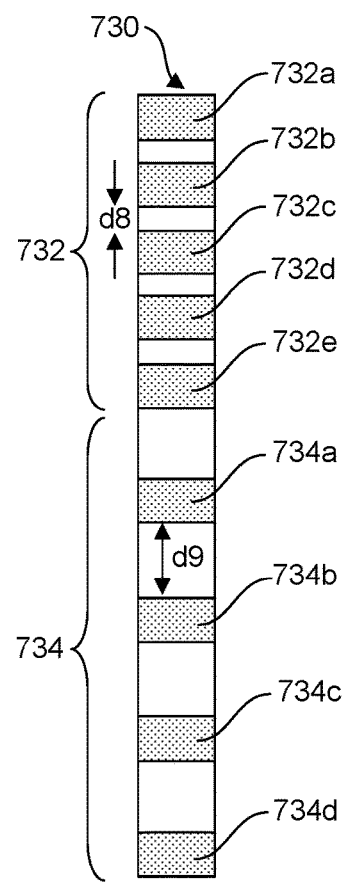

In some embodiments, which can be combined with any other embodiments discussed in this disclosure, the second ground marking is used by the self-driving system 100 to identify a proper distance needed between the self-driving system 100 and its surroundings (such as a storage rack). For example, FIG. 7C illustrates an example of a second ground marking 730 which is a line section having a first line section 732 and a second line section 734. The first line section 732 and the second line section 734 each includes an arbitrary number of alternating stripes 732a-732e and 734a-734d, respectively. In some cases, the alternating stripes 732a-732e of the first line section 732 and the alternating stripes 734a-734d of the second line section 734 are in different color. The alternating stripes 732a-732e are distributed at pre-determined intervals (only the interval d8 between the stripes 732b and 732c is shown for ease of illustration) along the longitudinal direction of the second ground marking 730. Likewise, the alternating stripes 734a-734d are distributed at pre-determined intervals (only the interval d9 between the stripes 734a and 734b is shown for ease of illustration) along the longitudinal direction of the second ground marking 730. The pre-determined intervals among the alternating stripes 732a-732e and 734a-734d are made equal so that the self-driving system 100 can read the information of the second ground marking 730 even if portions of the second ground marking 730 cannot be identified. The second ground marking 730 may contain more or less line sections (e.g., first and second line sections 732, 734) depending on the application.

In some embodiments, which can be combined with any other embodiments discussed in this disclosure, the intervals of the second ground marking 702 can be used to indicate an estimate distance of the self-driving system 100 to a reference point, which may be any known point provided on the map. For example, in some embodiments shown in FIG. 7C, which can be combined with any other embodiments discussed in this disclosure, the intervals among the alternating stripes 732a-732e (e.g., the interval d8) can have a first value representing an estimate distance from the first section to a reference point (e.g., a loading station of the warehouse), and the intervals among the alternating stripes 734a-734d (e.g., the interval d9) can have a second value representing an estimate distance of the second section to the loading station of the warehouse. By assigning the intervals at different alternating stripes of the second ground marking 702 with different values, the self-driving system 100 can determine how far it is from a reference point and thus locate its current location on a given map through recognition and association of the intervals with an estimate distance to the reference point.

In some embodiments shown in FIG. 7C, which can be combined with any other embodiments discussed in this disclosure, the intervals among the alternating stripes 732a-732e (e.g., the interval d8) may indicate a first distance required to keep between the self-driving system 100 and an object behind or adjacent to the first line section 732, which may be a storage rack, for example. The intervals among the alternating stripes 734a-734d (e.g., the interval d9) may indicate a second distance required to keep between the self-driving system 100 and an object behind or adjacent to the second line section 734, which may be a storage rack, for example. The first distance may be wider or narrower than the second distance, depending on the rules implemented in the area. Alternatively, the first distance and the second distance may each represent a pre-determined safety distance that should be kept between the self-driving system 100 and its surroundings.

In some embodiments shown in FIG. 7C, which can be combined with any other embodiments discussed in this disclosure, the intervals among the alternating stripes 732a-732e (e.g., the interval d8) and the intervals among the alternating stripes 734a-734d (e.g., the interval d9) can be used to indicate the level of road safety relative to the speed at which the self-driving system 100 is allowed. For example, the interval d8 may represent a first speed limit for the self-driving system 100, and the interval d9 may represent a second speed limit for the self-driving system 100. Once the self-driving system 100 identifies the level of safety concern associated with the alternating stripes 732a-732e (i.e., the first line section 732) or the alternating stripes 734a-734d (i.e., the second line section 734), the self-driving system 100 will not go over the speed limit allowed by the second ground marking.

In some embodiments shown in FIG. 7C, which can be combined with any other embodiments discussed in this disclosure, the intervals among the alternating stripes of the second ground marking can be used to determine priority of way to cross intersections when multiple self-driving systems coming to an intersection (e.g., T-shaped, circular or other type of intersections). For example, a warehouse may have two-way intersections which involve a crossing of a first lane and a second lane at one junction. The first lane may have a second ground marking containing alternating stripes 732a-732e near the junction while the second lane may have a second ground marking containing alternating stripes 734a-734d near the junction. The alternating stripes 732a-732e can be assigned with a higher priority of way to cross the two-way intersection than that of the alternating stripes 734a-734d. When two self-driving systems coming to the two-way intersection, the self-driving system on the second lane will not proceed until the self-driving system on the first lane has crossed the two-way intersection. The concept can be similarly applied to a 3-way or 4-way intersection by providing the second ground marking on each lane with distinct alternating stripes (and therefore different priority of way). In this manner, the traffic can be better controlled even if multiple self-driving systems are involved at the intersections.

In addition to the embodiments described herein, the intervals among the alternating stripes of the second ground marking can also be used to indicate various information to be given to the self-driving system 100, such as types of the inventory on a storage rack, indication of a charging station nearby, or newly implemented rules in the area, so that the self-driving system 100 can respond accordingly when traveling to areas having said second ground marking on the road surface.

Figure 8:
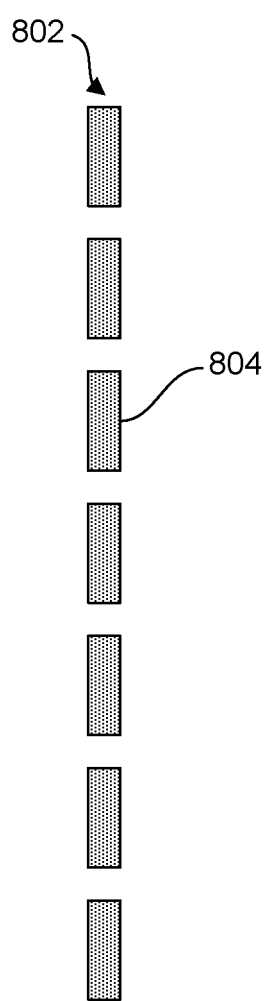
FIG. 8 illustrates an example of a third ground marking according to embodiments of the present disclosure.

The third ground marking 406 may be used to indicate a boundary of an area, a lane, or a warehouse aisle. In one embodiment, the third ground marking 406 is a line section containing machine-readable characteristics, such as a dashed line. FIG. 8 illustrates an example of a third ground marking 802 that uses a dashed line 804. While the dashed line is shown, other line patterns, such as dash-dotted line, dotted line, longdash line, or the like, may also be used.

Figure 9:
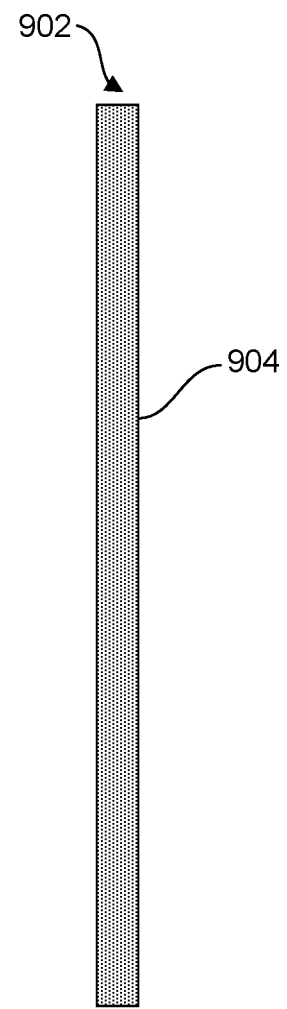
FIG. 9 illustrates an example of a fourth ground marking according to embodiments of the present disclosure.

The fourth ground marking 408 may be used to indicate a boundary of an area, a lane, or a warehouse aisle. In one embodiment, the fourth ground marking 408 is a line section containing machine-readable characteristics, such as a solid line. FIG. 9 illustrates an example of a fourth ground marking 902 that uses a solid line 904.

Figure 10A:
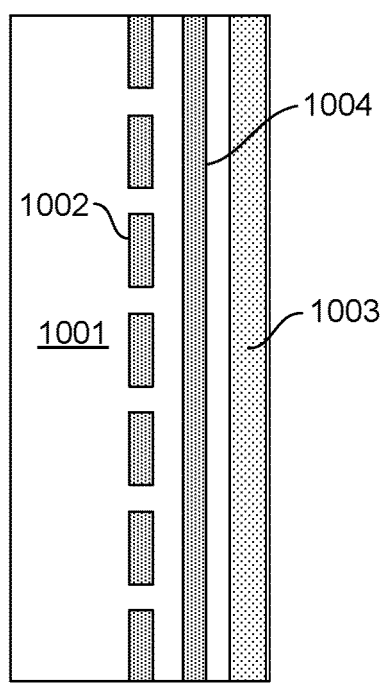
FIGS. 10A, 10B, 10C, 10D illustrate some possible combinations of the third and fourth types of ground markings according to embodiments of the present disclosure.
Figure 10B:
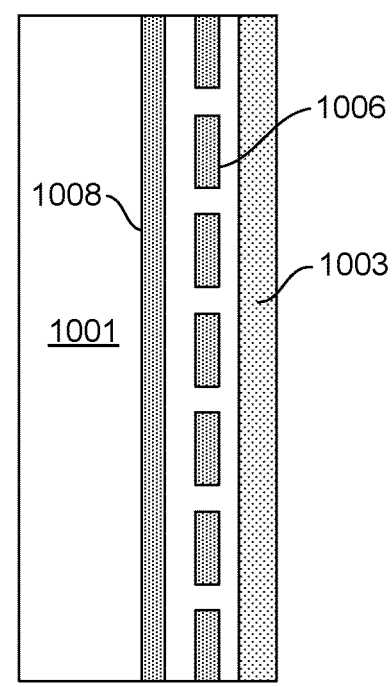
Figure 10C:
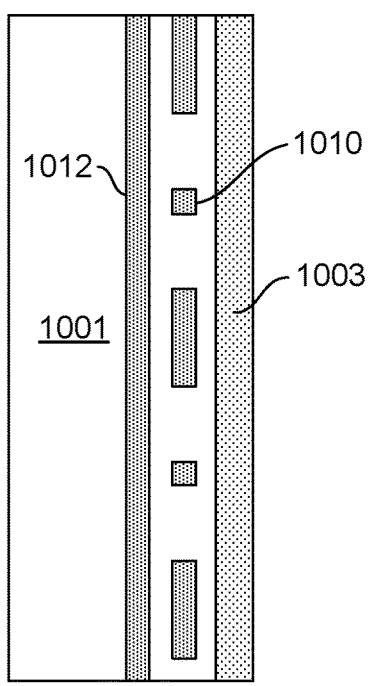
Figure 10D:
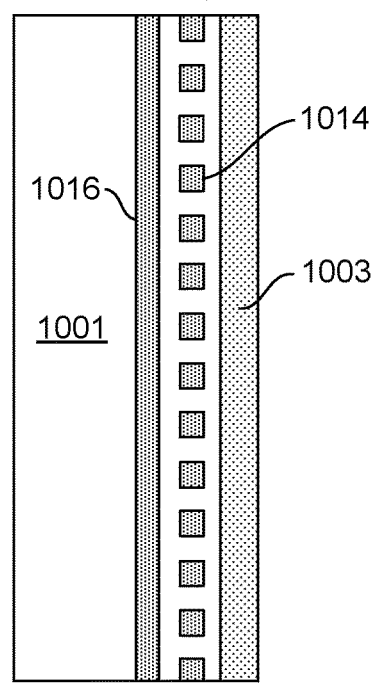

In some embodiments, which can be combined with any other embodiments discussed in this disclosure, the third ground marking 406 and the fourth ground marking 408 are collectively used to indicate various locations/areas inside a warehouse, such as a warehouse aisle number, a warehouse section number, or the like. FIGS. 10A, 10B, 10C, 10D are examples of some possible combinations of the third and fourth types of ground markings that can be provided on a ground surface 1001 along a storage rack (or any object) 1003 to indicate different aisles of a warehouse. For example, FIG. 10A illustrates a first combination of a third ground marking 1002 using a dashed line and a fourth ground marking 1004 using a solid line to represent Aisle 02, and the third ground marking 1002 is parallelly positioned to the left of the fourth ground marking 1004. FIG. 10B illustrates a second combination of a third ground marking 1006 using a dashed line and a fourth ground marking 1008 using a solid line to represent Aisle 03, and the fourth ground marking 1008 is parallelly positioned to the left of the third ground marking 1006. FIG. 10C illustrates a third combination of a third ground marking 1010 using a dashed line and a fourth ground marking 1012 using a solid line to represent Aisle 04, and the third ground marking 1010 is a dash-dotted line parallelly positioned between the fourth ground marking 1012 and the storage rack 1003. FIG. 10D illustrates a four combination of a third ground marking 1014 using a dashed line and a fourth ground marking 1016 using a solid line to represent Aisle 05, and the third ground marking 1014 is a dotted line parallelly positioned between the fourth ground marking 1016 and the storage rack 1003. The examples described herein serve only an illustrative purpose and should not be considered to limit implementation of the third and fourth types of ground markings.

Figure 10E:
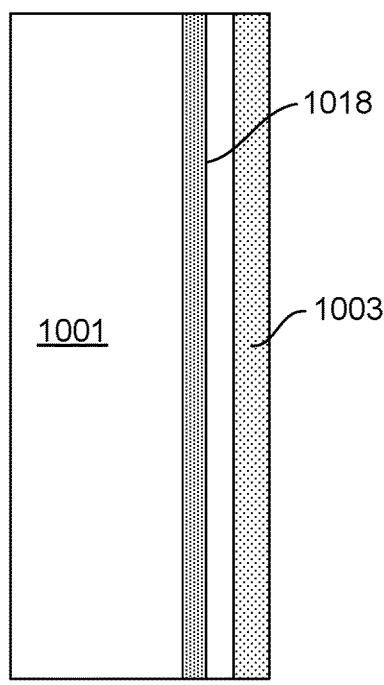
FIGS. 10E, 10F, 10G illustrate some possible alternatives of the third and fourth types of ground markings according to embodiments of the present disclosure.
Figure 10F:
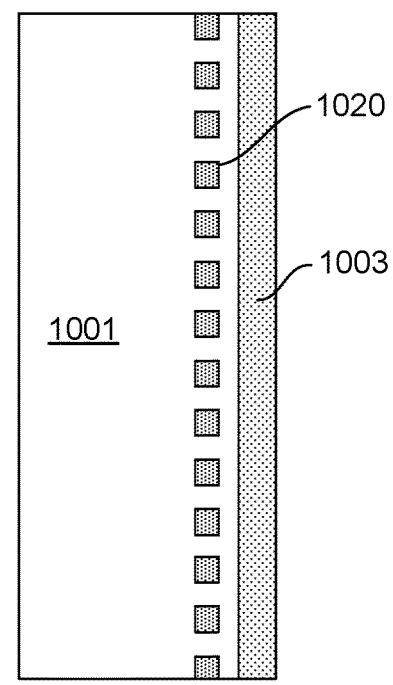
Figure 10G:
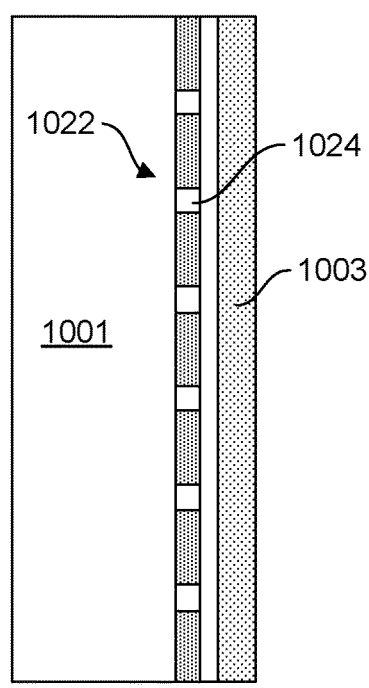

In some embodiments, which can be combined with any other embodiments discussed in this disclosure, a fourth ground marking (e.g., a solid line 1018) is used to represent Aisle 06, as shown in FIG. 10E. Alternatively, a third ground marking (e.g., a dashed line 1020) is used to represent Aisle 07, as shown in FIG. 10F. Yet alternatively, a second ground marking (e.g., a line section 1022 having alternating stripes 1024) is used to represent Aisle 08, as shown in FIG. 10G.

It is contemplated that length, width, shape, pattern etc. of the ground markings discussed above may vary, as well as intervals, distances, and relations between the ground markings may vary, depending on the application. Any of the ground markings discussed herein can be represented by a different color each being associated with a warehouse location ID. An ordinary skill in the art can adapt different types of lines and combinations to represent different areas, either indoors or outdoors.

Figure 11:
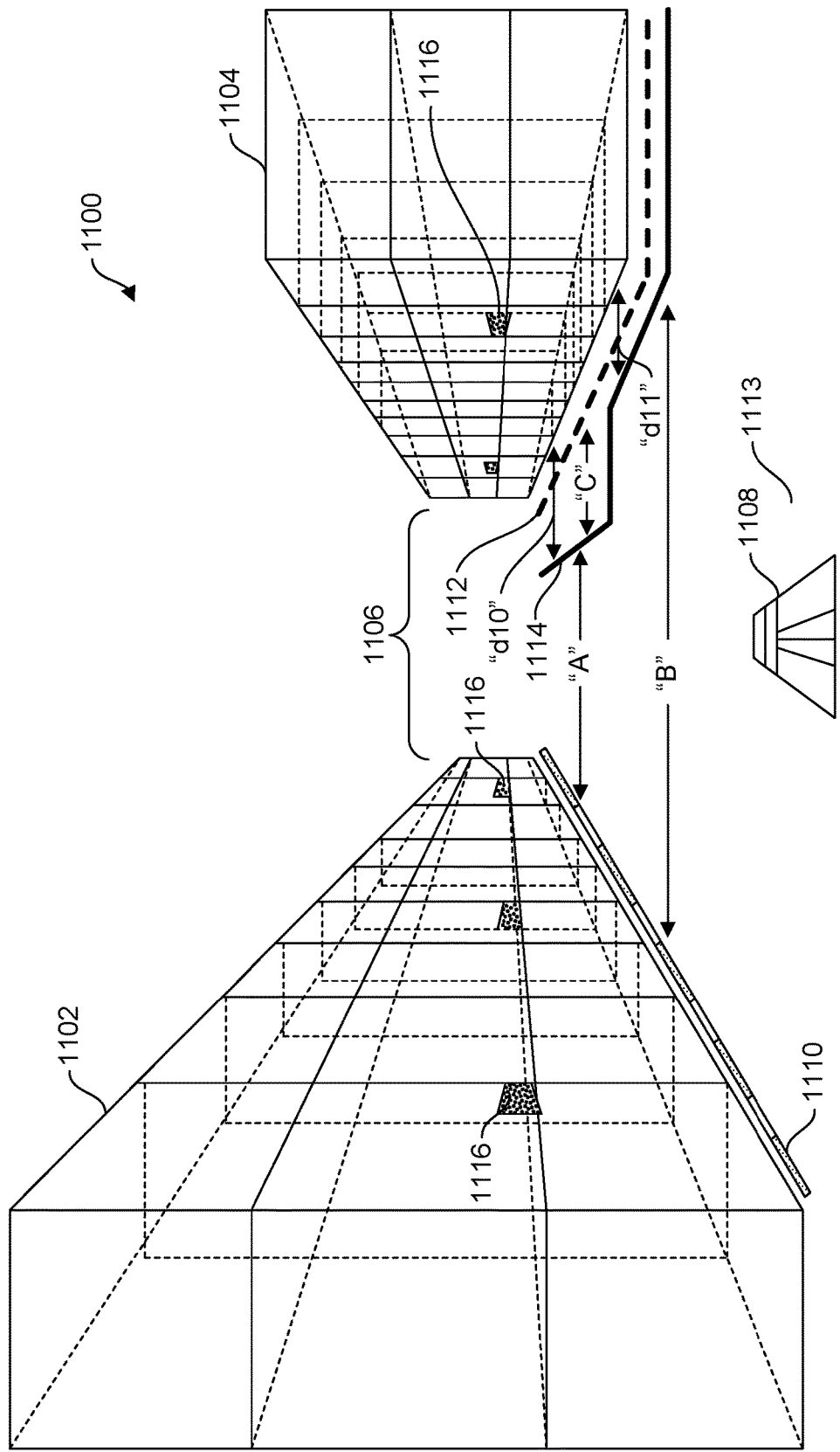
FIG. 11 illustrates a schematic view of a warehouse adapting an intelligent warehousing system according to embodiments of the present disclosure.

In some embodiments, which can be combined with any other embodiments discussed in this disclosure, the third ground marking 406 is used in conjunction with the second ground marking 404 and/or the fourth ground marking 408 to indicate a working area and/or a parking area for the self-driving system 100. FIG. 11 illustrates a schematic view of a warehouse 1100 adapting an intelligent warehousing system according to embodiments of the present disclosure. The warehouse 1100 may have a first storage rack 1102 and a second storage rack 1104 opposing the first storage rack 1102. The first storage rack 1102 and the second storage rack 1104 extend in a direction and define an aisle 1106 therebetween. The aisle 1106 has a first ground marking 1108 (such as the first ground marking 602), a second ground marking 1110 (such as the second ground marking 702), a third ground marking 1112 (such as the third ground marking 802), a fourth ground marking 1114 (such as the fourth ground marking 902) provided on the ground surface 1113. The first ground marking 1108 are plural in numbers (only one is shown for clarity) and distributed along the longitudinal direction of the aisle 1106 at pre-determined intervals. The second ground marking 1110 is distributed along the longitudinal direction of the aisle 1106 at a pre-determined distance from the first storage rack 1102. The third ground marking 1112 is distributed along the longitudinal direction of the aisle 1106 at a pre-determined distance from the second storage rack 1104. The third ground marking 1112 is disposed between the fourth ground marking 1114 and the second storage rack 1104 and along the longitudinal direction of the aisle 1106 at a pre-determined distance from the second storage rack 1104.

In some examples, the second ground marking 1110 and the fourth ground marking 1114 define a boundary of the aisle 1106 therebetween. The second ground marking 1110 or the fourth ground marking 1114 may use a color to indicate an information of the warehouse location ID, such as the aisle number.

In some examples, the fourth ground marking 1114 is distributed along the longitudinal direction of the aisle at different distances (e.g., distances d10 and d11) from the second storage rack 1104, wherein the distance d10 is wider than the distance d11.

In one example as shown in FIG. 11, the areas located between the second ground marking 1110 and the fourth ground marking 1114 (e.g., areas "A" and "B") are used to indicate a working area for the self-driving system (not shown, such as the self-driving system 100). In such a case, any of the cameras (e.g., cameras 114a, 115a, 124a, 126a) of the self-driving system 100, after identifying the second ground marking 1110 and the fourth ground marking 1114, will treat areas "A" and "B" as a working area, which means the self-driving system 100 is not allowed to park but can travel freely within areas "A" and "B" for performing a task, e.g., picking up goods from the first storage rack 1102 or the second storage rack 1104.

In one example as shown in FIG. 11, certain areas (e.g., area "C") located between the third ground marking 1112 and the fourth ground marking 1114 (i.e., areas having a greater distance d10 between the third ground marking 1112 and the second storage rack 1104) are used to indicate a parking zone for the self-driving system (not shown, such as the self-driving system 100). In such a case, any of the cameras (e.g., cameras 114a, 115a, 124a, 126a) of the self-driving system 100, after identifying the third ground marking 1112 and the fourth ground marking 1114, will treat the area "C" as a parking zone, which means the self-driving system 100 is allowed to park anywhere within the area "C".

In some embodiments, which can be combined with any other embodiments discussed in this disclosure, an intelligent warehousing system further includes a machine-readable label 1116, such as a QR code, a barcode, or any suitable optical labels. The machine-readable label 1116 can be disposed on the first storage rack 1102 and the second storage rack 1104. The machine-readable label 1116 may contain a unique information of the storage racks 1102, 1104 and/or inventory. Therefore, any of the cameras (e.g., cameras 114a, 115a, 124a, 126a) of the self-driving system 100, after identifying the machine-readable label 1116, can quickly determine the location of the self-driving system 100 on a given map. The machine-readable label 1116 may also be placed at various locations of the facility, such as on building poles of a warehouse. In some cases, the self-driving system 100 can improve the positioning accuracy by integrating information previously obtained from any of the first, second, third, and fourth types of ground markings 1108, 1110, 1112, 1114 as well as information from the machine-readable label 1116.

Figure 12:
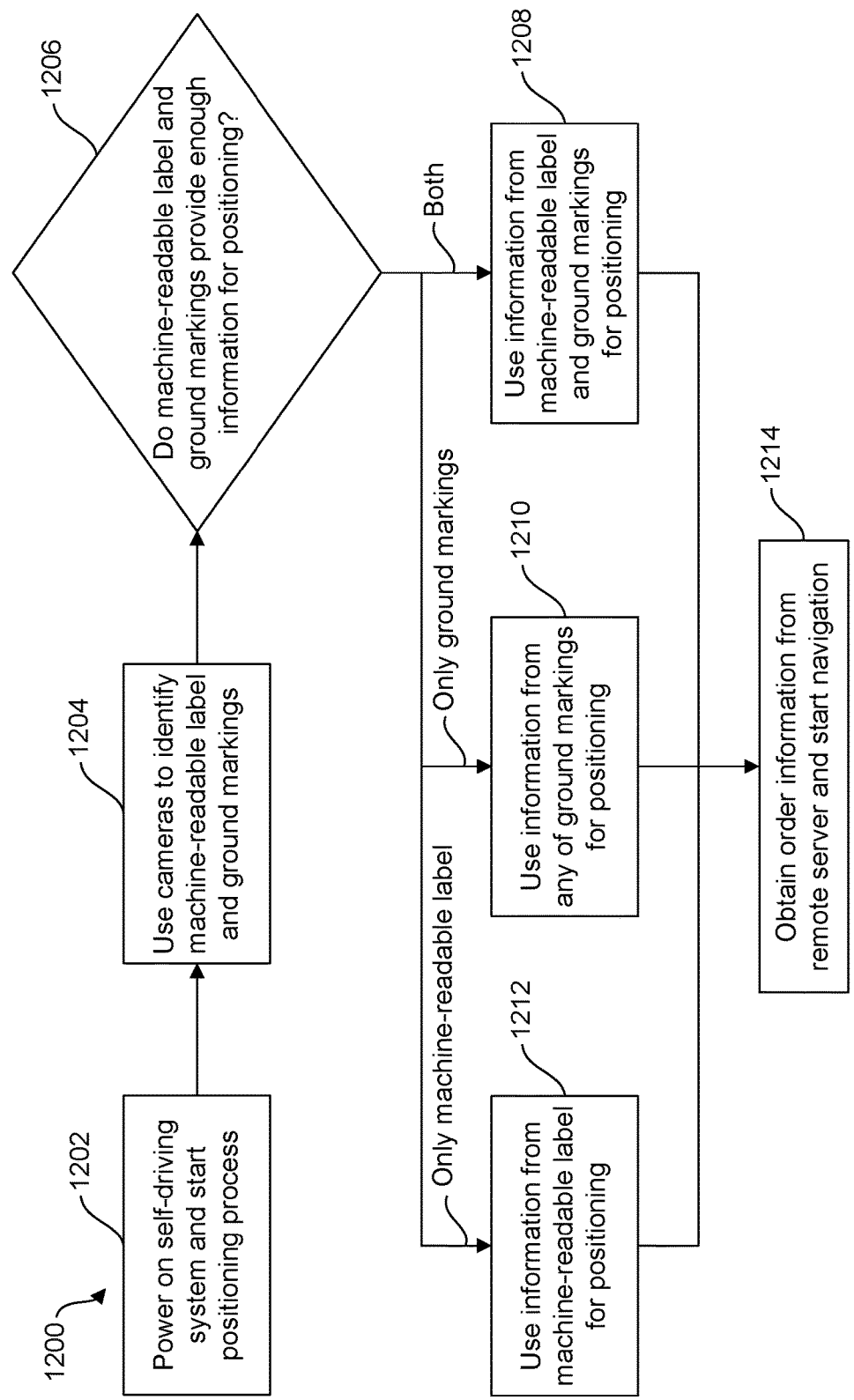
FIG. 12 illustrates an exemplary flowchart that can be implemented by a self-driving system according to embodiments of the present disclosure.

FIG. 12 illustrates an exemplary flowchart 1200 that can be implemented by a controller (e.g., controller 160) of a self-driving system (e.g., the self-driving system 100) according to embodiments of the present disclosure. At block 1202, the self-driving system is powered on and directed by the controller to performing a task, such as a positioning process.

At block 1204, the self-driving system is directed by the controller to use cameras, such as cameras 114a, 115a, 124a, 126a of the self-driving system 100, to identify machine-readable labels (e.g., machine-readable label 1116) and various ground markings of an intelligent warehousing system (e.g., first, second, third, and fourth types of ground markings 404, 406, 408, 410) implemented by a facility, such as a warehouse.

At block 1206, the self-driving system is directed by the controller to determine if the information obtained from the machine-readable labels and various ground markings are sufficient to pinpoint location of the self-driving system on a given map, such as a map of the warehouse. The flowchart 1200 then proceeds to block 1208 if the information from the machine-readable labels and various ground markings can pinpoint current location of the self-driving system on the map. If the self-driving system receives nothing from the machine-readable labels but only information from any or all of the ground markings, then the flowchart 1200 proceeds to block 1210. If the self-driving system receives nothing from any of the ground markings but only information from the machine-readable labels, then the flowchart 1200 proceeds to block 1212.

At block 1208, the self-driving system is directed by the controller to use the information obtained from the machine-readable labels and various ground markings for positioning of the self-driving system on the map.

At block 1210, the self-driving system is directed by the controller to use information from any or all of the ground markings to determine its location on the map.

At block 1212, the self-driving system is directed by the controller to use information from the machine-readable labels to determine its location on the map.

At block 1214, once the current location of the self-driving system is identified on the map, the self-driving system is directed by the controller to obtain an order information from a remote server and start navigation of the route from the current location to a destination using the location information received from the machine-readable labels and/or any or all of the ground markings.

Figure 13:
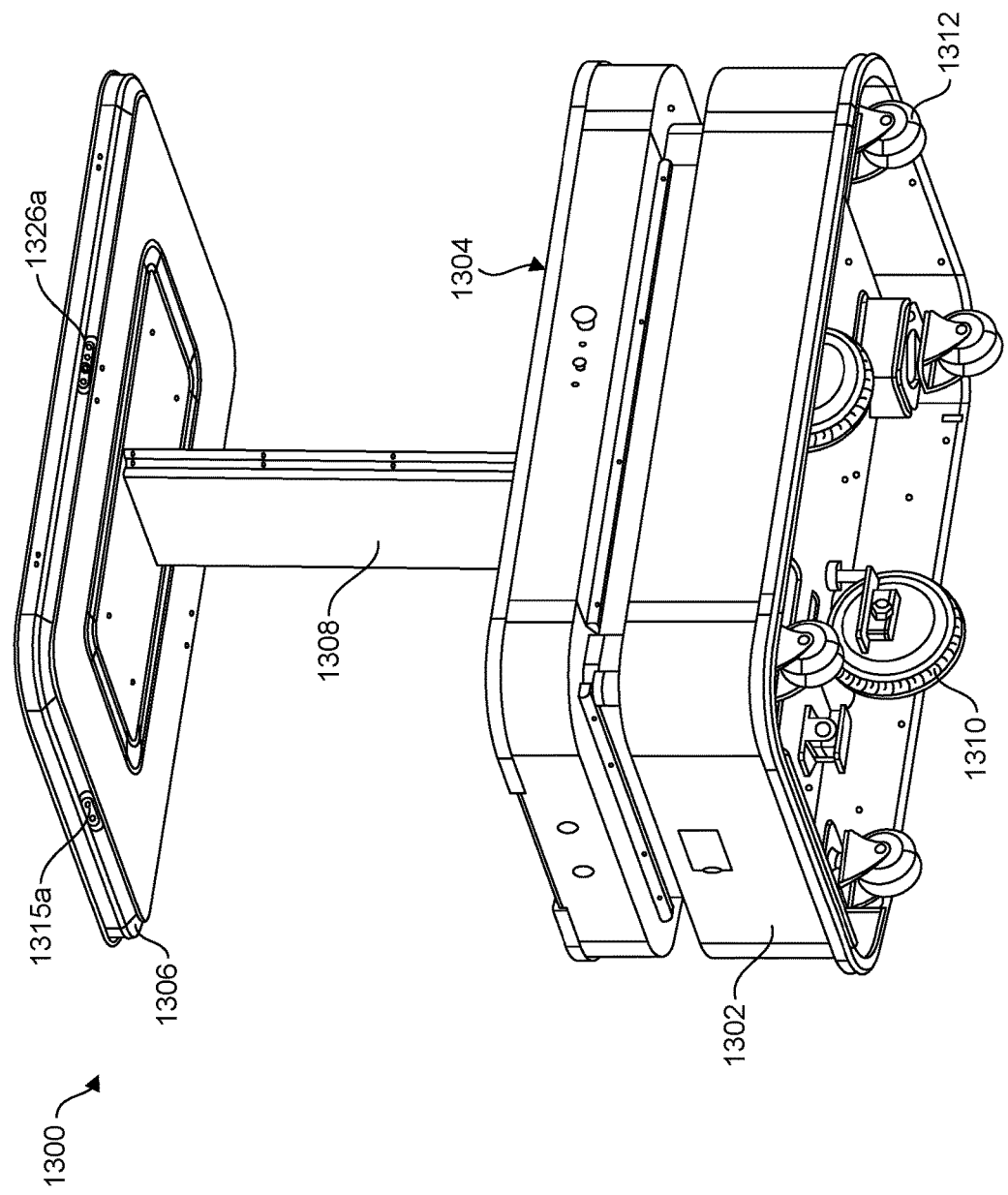
FIG. 13 illustrates a schematic view of a self-driving system that can be used to practice various embodiments of the present disclosure.

FIG. 13 illustrates a schematic view of a self-driving system 1300 that can be used to practice various embodiments of the present disclosure. The self-driving system 1300 generally has a mobile base 1302 and a plate 1306 disposed over the mobile base 1302 for supporting goods. The height of the plate 1306 may be adjusted, either by increasing or decreasing the height of a frame 1308, or securing the plate 1306 at different height of the frame 1308. The frame 1308 extends upwardly from a center of a top surface 1304 of the mobile base 1302 to a bottom of the plate 1306. The self-driving system 1300 is directed to move autonomously using one or more motorized wheels 1310 and a plurality of stabilizing wheels 1312. The self-driving system 1300 is essentially identical to the self-driving system 100 except that the frames 108, 110 of the self-driving system 100 are being replaced with a singular frame 1308.

The self-driving system 1300 also has plurality of cameras disposed around and faced outwards from the self-driving system 1300. In one embodiment, the front end and back end of the plate 1306 are equipped with a camera (only a back-end camera 1315a is shown), and the opposing length sides of the plate 1306 are equipped with a camera (only a side camera 1326a is shown). The cameras (e.g., cameras 1315a, 1326a) are configured similarly as the cameras 114a, 115a, 124a, 126a of the self-driving system 100 to interact with an intelligent warehousing system, such as machine-readable characteristics of ground markings (e.g., first, second, third, and fourth ground markings 404, 406, 408, 410) and/or machine-readable labels (e.g., machine-readable label 1116), as discussed above with respect to FIGS. 4, 5, 7A-7C, 8, 9, 10A-10G and 11. Likewise, the information obtained from various ground markings and machine-readable labels enable the self-driving system 1300 to identify its location on a given map or perform an action in response to information provided on the ground markings/machine-readable labels.

Benefits of the present disclosure include an intelligent warehousing technology for self-driving systems by providing various ground markings on a ground surface of an indoor facility. Each ground marking contains machine-readable characteristics that can be captured by cameras of the self-driving systems to locate position of the self-driving systems on a given map, or control operation of the self-driving systems. The machine-readable characteristics of the ground markings are arranged in a unique pattern and/or at pre-determined intervals such that the cameras can still read the information on the ground markings even if portions of the ground markings cannot be identified. Therefore, the present intelligent warehousing technology offers better wear-out tolerance than traditional road markings using QR codes and is particularly useful for navigating self-driving systems indoors when GPS signal is poor.

While the foregoing is directed to embodiments of the disclosure, other and further embodiments of the disclosure thus may be devised without departing from the basic scope thereof, and the scope thereof is determined by the claims that follow.

The invention claimed is:
1. A warehousing system, comprising:
    a storage rack disposed in a warehouse, the storage rack extends in a direction and defines an aisle along the storage rack;
    a first ground marking arranged on a ground surface of the aisle, the first ground marking comprising machine-readable characteristics representing a warehouse location identification number (ID), the machine-readable characteristics comprising:
        one or more horizontal lines parallelly arranged at equal intervals, wherein the total number of the one or more horizontal lines corresponding to a first information of the warehouse location ID; and
        one or more vertical lines parallelly arranged at equal intervals, wherein the total number of the vertical lines corresponding to a second information of the warehouse location ID that is different from the first information, wherein the machine-readable characteristics are recognizable by one or more cameras of a self-driving system, and the self-driving system is operable to determine its position on a predetermined map of the warehouse based on the warehouse location ID, and the predeteimined map is installed in a controller of the self-driving system.
2. The warehousing system of claim 1, further comprising:
    a second ground marking arranged on and along the ground surface of the the aisle, wherein the second ground marking is recognizable by the one or more cameras, and the second ground marking comprises a first line section having an arbitrary number of alternating stripes distributed at first equal intervals, and
wherein the self-driving system is operable to determine its position on the map based on the first equal intervals and a travel distance of the self-driving system from a reference point.

3. The warehousing system of claim 2, wherein the second ground marking further comprises a second line section having an arbitrary number of alternating stripes distributed at second equal intervals that are different from the first equal intervals.

4. The warehousing system of claim 3, wherein the first equal intervals have a first value representing an estimate distance of the self-driving system from the first line section to the reference point, and the second equal intervals have a second value representing an estimate distance of the self-driving system from the second line section to the reference point.

5. The warehousing system of claim 3, wherein the first equal intervals representing a first speed limit for the self-driving system to travel on the ground surface, and wherein the second equal intervals representing a second speed limit for the self-driving system to travel on the ground surface, and the first speed limit is different from the second speed limit.

6. The warehousing system of claim 3, wherein the first equal intervals representing a first priority of way for the self-driving system to cross intersections, and wherein the second equal intervals representing a second priority of way for the self-driving system to cross intersections, and the first priority of way is higher than the second priority of way.

7. The warehousing system of claim 3, wherein the first equal intervals representing a first safety distance needed between the self-driving system and a first storage rack adjacent to the first line section, and wherein the second equal intervals representing a second safety distance needed between the self-driving system and the first storage rack adjacent to the second line section, and the first safety distance is different from the second safety distance.

8. The warehousing system of claim 7, further comprising:
a third ground marking arranged on and along the ground surface of the the aisle, wherein the third ground marking comprises a dashed line distributed along a second storage rack, and the second storage rack is disposed adjacent to the third ground marking and opposing the first storage rack; and
a fourth ground marking arranged on and along the ground surface of the the aisle, wherein the fourth ground marking comprises a first solid line disposed at a first distance from the second storage rack, and wherein the third ground marking and the fourth ground marking are arranged to represent different warehouse location identification numbers.

9. The warehousing system of claim 8, wherein the fourth ground marking further comprises:
a second solid line disposed at a second distance from the second storage rack, and the first distance is greater than the second distance,
wherein an area between the third ground marking and the first solid line of the fourth ground marking represents a parking area for the self-driving system, and
wherein an area between the second ground marking and the fourth ground marking represents a working area for the self-driving system.

10. The warehousing system of claim 8, further comprising:
a machine-readable label disposed within the warehouse, wherein the machine-readable label is a QR code, a barcode, or an optical label, and the machine-readable label is recognizable by the one or more cameras of the self-driving system to identify location of the self-driving system on the predetell lined map of the warehouse.

11. A warehousing system for use with a self-driving system, comprising:
a storage rack disposed in a warehouse, wherein the storage rack extends in a direction and defines an aisle along the storage rack;
a first ground marking arranged on a ground surface of the aisle, the first ground marking comprising machine-readable characteristics representing a warehouse location identification number (ID), the machine-readable characteristics comprising:
one or more horizontal lines parallelly arranged, wherein the total number of the one or more horizontal lines corresponding to a first information of the warehouse location ID; and
one or more vertical lines parallelly arranged, wherein the total number of the vertical lines corresponding to a second information of the warehouse location ID that is different from the first information; and
a self-driving system, comprising:
one or more cameras configured to recognize the machine-readable characteristics;
a controller operable to:
project a field of view from the one or more cameras onto the ground surface of the aisle;
determine a location of the self-driving system on a predetermined map of the warehouse based on the first ground marking appeared in the field of view, and the predetermined map is installed in the controller of the self-driving system; and
navigate the self-driving system from a determined location to a destination.

12. The warehousing system of claim 11, wherein the one or more horizontal lines and one or more vertical lines are parallelly arranged at equal intervals.

13. The warehousing system of claim 11, wherein the self-driving system further comprises:
a mobile base;
a plate disposed over the mobile base; and
a first frame coupling the plate to the mobile base.

14. The warehousing system of claim 13, wherein the one or more cameras comprises:
a first camera disposed at a first length side of the plate, the first camera being oriented such that an optical axis of the first camera intersecting the ground surface having the field of view projected from the first camera; and
a second camera disposed at a second length side of the plate, the second camera being oriented such that an optical axis of the second camera intersecting the ground surface having the field of view projected from the second camera.

15. The warehousing system of claim 14, wherein the one or more cameras further comprises:
a third camera disposed at the first frame, the third camera being oriented such that an optical axis of the third camera intersecting the ground surface having the field of view projected from the third camera.

16. The warehousing system of claim 15, wherein the first frame extends upwardly from a center of a top surface of the mobile base to a bottom of the plate.

17. The warehousing system of claim 15, further comprising:
- a second frame coupling the plate to the mobile base; and
- a fourth camera disposed at the second frame, the second camera being oriented such that an optical axis of the fourth camera intersecting the ground surface having the field of view projected from the fourth camera.

18. The warehousing system of claim 17, wherein the first and second frames are disposed at opposing ends of the mobile base.

19. The warehousing system of claim 11, wherein the ground surface further comprises:
- a second ground marking arranged on and along the ground surface of the aisle, wherein the second ground marking is recognizable by the self-driving system, and the second ground marking comprises:
  - a first line section having an arbitrary number of alternating stripes distributed at first equal intervals, and the controller is operable to determine a position of the self-driving system on the map based on a travel distance of the self-driving system from a reference point and the first equal intervals.

20. The warehousing system of claim 19, wherein the second ground marking further comprises:
- a second line section having an arbitrary number of alternating stripes distributed at second equal intervals that are different from the first equal intervals.

* * * * *